Nov. 2, 1937.  H. S. BROWN  2,097,430
TIE REMOVER
Filed Oct. 12, 1933   2 Sheets-Sheet 1

Inventor:
Hugh S. Brown
By Wilkinson, Huxley, Byron & Knight attys.

Nov. 2, 1937.   H. S. BROWN   2,097,430
TIE REMOVER
Filed Oct. 12, 1933   2 Sheets-Sheet 2
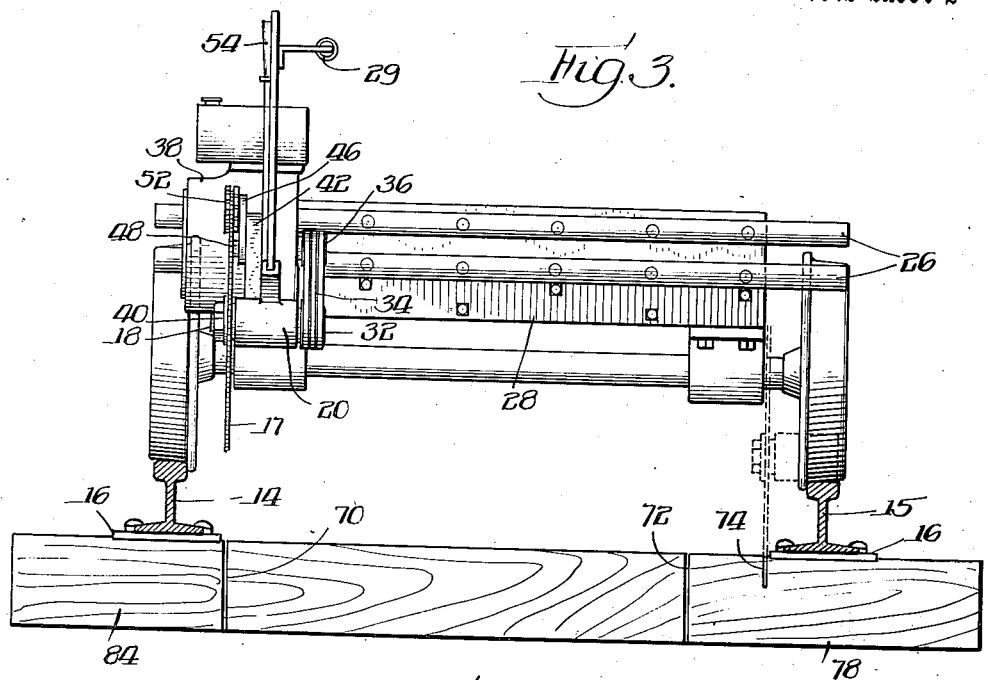
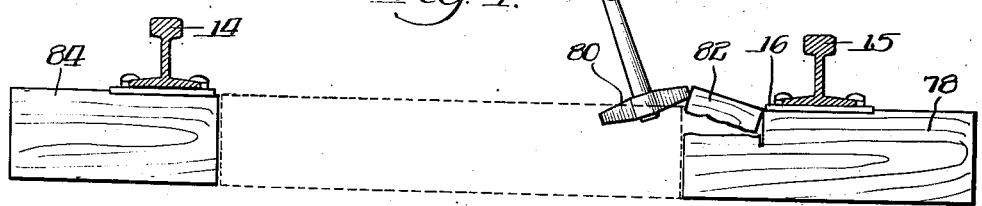
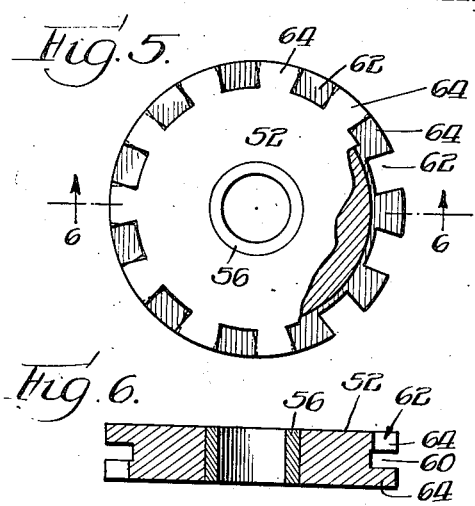
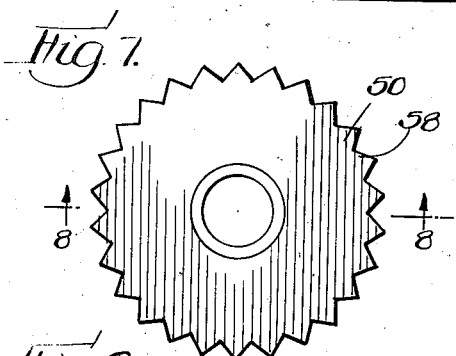
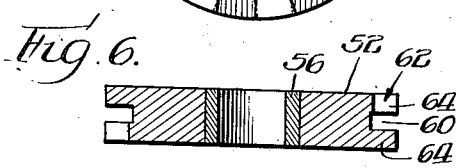
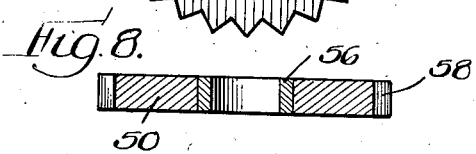
Inventor:
Hugh S. Brown
By: Wilkinson, Huxley, Byron & Knight attys.

Patented Nov. 2, 1937

2,097,430

UNITED STATES PATENT OFFICE 2,097,430

TIE REMOVER

Hugh S. Brown, Harvey, Ill., assignor to Hubron Company, Inc., Somerville, N. J., a corporation of New Jersey Application October 12, 1933, Serial No. 693,241

4 Claims. (Cl. 143—43)

The present invention relates to apparatus for and the method of removing ties, and in some of its broader aspects to the general art of sawing. According to the illustrated form of this invention, a disk saw is carried on a vertically pivotal frame, together with means such as a motor for rotating said saw. The frame may conveniently be pivoted to and detachable from the end of a railroad section car. Carried by the aforementioned frame in the plane of the saw disk and pivotably mounted in positions such that they may be thrust against the edge of the disk are two rotatable wheels, one a tooth-forming wheel and the other a sizing wheel. These wheels are made of hard metal, whereas the saw disk is made of a decidedly softer metal such as soft iron. According to the preferred method of procedure, the saw is first prepared by rotating the saw by the motor at high speed, forming or reforming the teeth on the disk by turning the lever in the direction to press the tooth-forming wheel against the disk and then trimming the sides of the teeth by pressing the sizing wheel onto the edge of the disk and into a shearing overlapping engagement with its periphery. Thereafter, with these two wheels disengaged the rotating saw is pressed against and through the tie just inside of each rail without ordinarily having to remove ballast from under the tie. Then the center portion of the tie is removed by raising it between the rails and the end portions are removed by knocking them out endwise from under the rail. Because of its contact with the ballast, the saw disk is quickly dulled, but because of its softness it is rarely if ever nicked, and it is almost instantaneously sharpened by use of the tooth-forming wheel and sizing wheel.

In the past the most expensive part of replacing the ties has been the removal of the old ties. Probably the chief reason for this is that the tie or tie plate is usually imbedded or countersunk into the tie so that it is impossible to simply knock out the old tie endwise. In fact this is sometimes prevented by the ballast alone. This difficulty could be overcome by jacking up the rail, but this is subject to the very serious disadvantage that other ties are raised, with the result that ballast falls under them and prevents their settling to their original positions. The result is that a hump is left in the rail which obviously is undesirable for modern railroads having high speed trains. The procedure of sawing through the tie adjacent the rails has been contemplated (see Patent 1,732,568 to Robb), but sawing has never been practical heretofore because unless a great deal of ballast was removed from between the ties and even from underneath the ties, the saw was likely to be completely ruined with a single operation. In fact, it is possible that, in many instances at least, several saws would have to be used for a single tie. Any deep disturbance of the ballast under the tie is very objectionable, because it is then extremely difficult to get proper support for the new tie, i. e. support which will not settle under the effect of traffic. Probably the most common procedure heretofore has been the expensive procedure of removing all of the ballast from one side of the tie to a level far enough below the bottom of the tie so that the tie could be knocked laterally to this hollowed-out position of the ballast and then removed endwise from under the rail. Even this procedure is sometimes extremely difficult due to the close spacing of the ties, and it is always slow on account of the obstruction of the rails, so the labor cost is excessive. It is therefore an object of the present invention to provide suitable apparatus and a suitable method for removing the ties with the utmost economy and with the least disturbance to the bed of ballast.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a somewhat diagrammatic side elevation of the apparatus;

Figure 3 is an end view of the structure shown in Figure 1 and illustrates in addition the points at which the tie is cut;

Figure 4 illustrates the method of removal of the tie;

Figure 5 is an axial view of the sizing wheel;

Figure 6 is a cross sectional view through the line 6—6 of Figure 5;

Figure 7 is an axial view of the tooth-forming wheel; and

Figure 8 is a cross sectional view along the line 8—8 of Figure 7.

Figure 1:
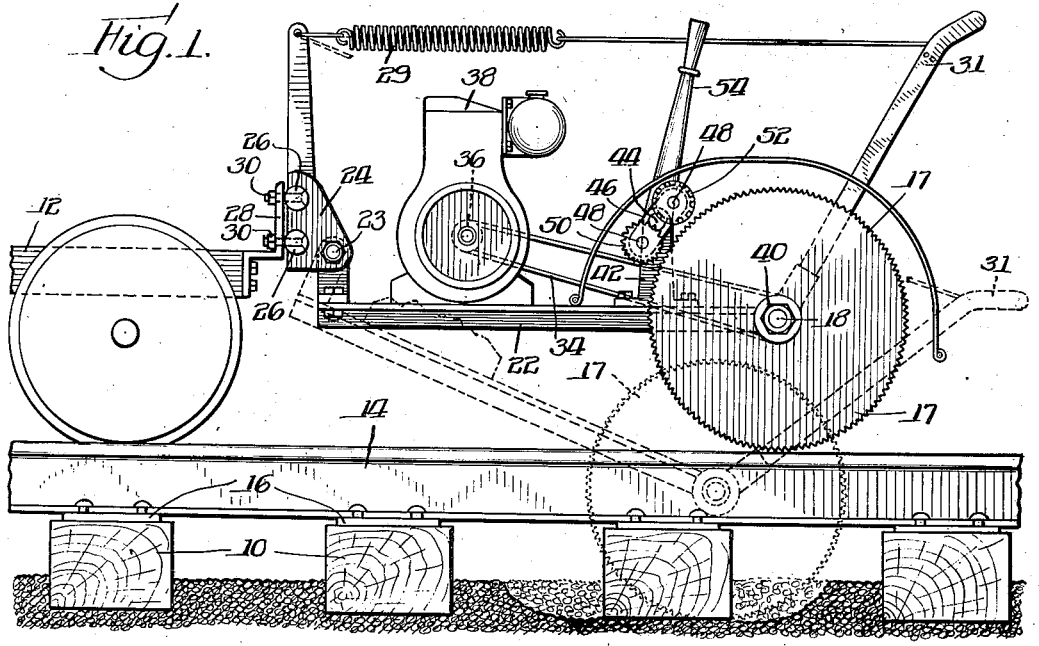
Figure 2:
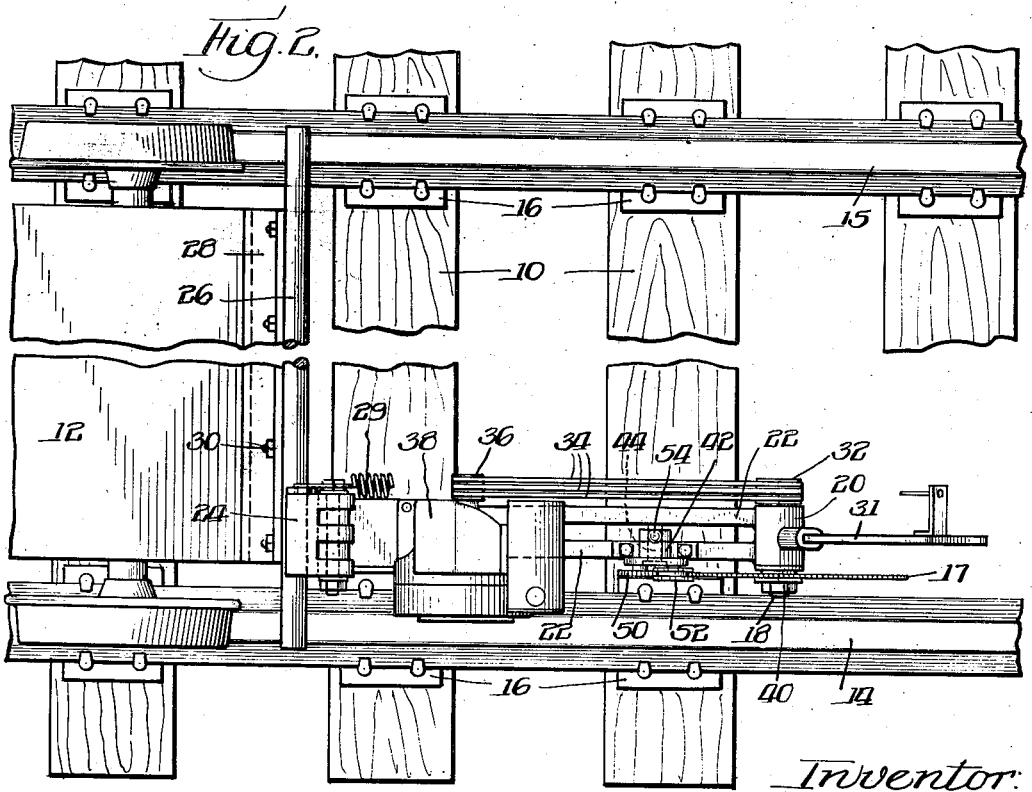
Figure 2 is a plan view of the structure shown in Figure 1.

Although my invention may take many forms, only one has been chosen for illustration. This form has been shown as used for cutting the tie 10 and as supported on a motor section car 12 running on the rails 14 and 15 supported on the tie plates 16, under which the tie 10 is positioned. The working element of the apparatus is the saw disk 17 which is carried on one end of a shaft 18 mounted in suitable frictionless bearings (not shown) in the hub 20 at the end of the frame work 22, which frame work may conveniently be supported at one end by a removable bolt 23 about which it is pivotable vertically. The bolt 23 may be secured to a casting 24 which may be mounted on bars 26 so that it may be slid lengthwise along said bars. Said bars may be supported in any suitable manner from the hand car, as by means of brackets 28 and stud screws 30. Extending upwardly and rearwardly from the hub 20 is a suitable handle 31 with which the frame and the disk saw carried thereby may be manipulated. A spring 29 may be provided to normally hold the apparatus in its upper position as shown in Figure 1.

A pulley 32 is shown mounted on the shaft 18, on the end of said shaft other than the end carrying the saw. This pulley carries one or more belts 34 which extend around a pulley 36 of the motor diagrammatically illustrated at 38. Of course sprockets and chain could be used if desired. It may be noted that in accordance with usual disk saw practice the pulleys 32 and 36 are keyed to their shaft, but the disk saw 17 is held sufficiently tight by a nut 40. Mounted on the frame work 22 is an upstanding bracket 42. Mounted on the stub shaft 44 extending through the bracket 42 is a plate 46. Pivoted at the ends of this plate by stub shafts 48 are the tooth-forming wheel 50 and the sizing wheel 52. The plate 46 is keyed at its center to the shaft 44 to which in turn is keyed a handle 54. Swinging this handle in either direction will swing either the tooth-forming wheel 50 or the sizing wheel 52 into engagement with the periphery of the saw disk 17. Normally these wheels are held out of engagement with the saw disk by a spring detent or any other means, not shown. The forming wheel 50 is of a simple construction shown in Figures 7 and 8 and is made of a relatively high carbon or other hard steel or some other fairly hard metal, save for the self-lubricating bearing bushing 56. When this tooth-forming wheel is pressed against the saw disk 17 while the disk is being rotated by the motor 38, the sharp teeth 58 of the wheel dig into the metal of the saw disk which is preferably made of a soft steel such as that commonly called blue annealed sheet iron or other metal of about the same hardness.

In the process of being pressed into the saw disk to form the teeth thereon, the forming wheel 50 presses burrs laterally so that they project from the face of the disk. These burrs are beneficial if they do not project too far, since they take the place of the set of an ordinary saw disk in cutting a slot wide enough to provide sufficient clearance for the saw. However, it is of course desirable that these burrs be uniform in size and that they should not be so long that they will be easily flattened out. Therefore, after the tooth-forming wheel 50 has been used, the lever 54 is swung in the other direction and the sizing wheel 52 is pressed against the periphery of the saw disk and into overlapping engagement therewith. Due to the overlapping engagement, and due to the rotation of the saw disk and the consequent rotation of the sizing wheel this wheel trims the burrs to the desired size.

This sizing wheel, which is also made of a fairly hard metal, preferably the same metal as that of which the forming wheel 50 is formed, has formed therein a peripheral slot 60 of the right width for the saw tooth. The flange to each side of the slot 60 is preferably notched with wide cut-outs 62 leaving the wide tooth segments 64. The tooth segments 64 of the two flanges are preferably staggered with respect to one another. The wheel 52 should of course be provided with a suitable bearing such as the self-lubricating bushing 66 similar to the bushing 56 of the wheel 50. There is no one definite metal that must be used for the wheels 50 and 52. It is sufficient that they be hard enough to form the teeth properly on the disk saw 17, which in turn must be hard enough to cut through even hard wood in the ties.

When the saw disk 17 has been sharpened in the manner indicated, or when the teeth therein have been originally formed in that manner, it is ready for use in removing the ties. According to this use the saw disk is in the lateral position illustrated, i. e., adjacent the rail 14 or its tie plate 16 if one is used. The saw being rotated by the motor is lowered by the handle 31 to cut through the tie, making the cut 70 therein. The frame work 22 is then slid along the support bars 26 to a position near the rail 15 but sufficiently far therefrom so that the pulley 32 will not hit the top of said rail as it is being lowered. In this position the saw disk 17 is lowered to again cut through the tie, forming the cut 72. Once more the frame work may be shifted, this time to a position such that the disk will form the cut 74 adjacent the rail 15 or its tie plate 16. In this position the pulley 32, or perhaps the hub 20 will strike the top of the rail and prevent the saw disk 17 from cutting entirely through the tie. The center section 76 being released from the rest of the tie by the cuts 70 and 72 may be lifted upwardly and removed; thereafter the end portion 78 of the tie may be split, as with a spike maul 80, and a chunk 82 adjacent the tie plate 16 removed. This unlocks the end portion 78 of the tie so that it may be knocked lengthwise outwardly from under the rail. The end portion 84 may likewise be knocked out from under the rail without any further special treatment. Of course if it should be desired, the saw disk may be sufficiently large to cut entirely through the tie even though the hub does strike the top of the rail. There are objections to this, however, so that it is preferred to use a disk of about 22 inches, and, when the rail is too high for this saw, to cut through the tie to use the process described. Another alternative would be to use two saw disks, one for each rail, the hub for each disk being located on the side of the disk toward the center of the track.

In instances where this invention is to be used with a rail car provided with a motor for its propulsion, the motor illustrated herein may be omitted and provision made for driving the saw disk from the motor of the car. One manner of doing this is to provide a pulley on one of the driving wheels of the car, jack up these driving wheels and drive an intermediate shaft from said pulley, pivot the frame about said intermediate shaft and drive the saw disk from said shaft.

Instead of using two wheels, one a tooth-forming wheel and the other a sizing wheel, one wheel may be used for both functions by forming teeth at the bottom of the peripheral slot of the sizing wheel. Such teeth would have three separate disks, a center toothed disk and two outer flange disks rigidly secured together. Such a wheel, or for that matter the wheels illustrated, could be used during the sawing process if sufficient power is provided to maintain the speed of the saw disk.

It is to be understood that many other embodiments of the invention, including some in improved form will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. The process of removing a tie from a railroad when it is locked against lengthwise movement by countersinking of the rail into the tie and when it is adjacent to hard objects which would be detrimental to the teeth of a saw, which comprises: preparing a soft steel saw disk by molding teeth thereon by rotating the same against a rotatable hard steel tooth-forming wheel, subsequently rotating the disk against a rotatable sizing wheel arranged to engage the periphery of the saw disk in overlapping relation and constructed to trim off the burrs from said teeth to a predetermined size, and thereafter continuing to rotate said saw, sawing through said tie adjacent to the inside point at which the rail is countersunk therein, and at a point inside of the other rail, removing the central portion thus severed from the tie by lifting it between the rails and thereafter removing the end portions of the tie by a lengthwise movement.

2. The process of removing a tie from a railroad when the track structure is countersunk into the tie which consists in cutting a central portion from said tie, cutting into said tie adjacent the countersunk track structure and on the inside thereof, removing the central portion of the tie, splitting an upper chunk of the remaining end of the tie from its inner end face to said last named cut and removing said end portion by lengthwise movement thereof.

3. Apparatus for removing railroad ties comprising suitable framework supported for pivotal movement in a vertical plane, a soft steel saw disc rotatably mounted on said framework, said saw disc being capable of movement into cutting engagement with the ties upon pivotal movement of said framework, means carried by said framework for rotating said saw disc, an upstanding support secured to said framework adjacent the saw disc, and means carried by said upstanding support for forming teeth on said saw disc, said teeth forming means being shiftable into and out of engagement with the saw disc.

4. Apparatus for removing railroad ties comprising suitable framework supported for pivotal movement in a vertical plane, a soft steel saw disc rotatably mounted on said framework, said saw disc being capable of movement into cutting engagement with the ties upon pivotal movement of said framework, power means carried by the framework for rotating said disc, an upstanding support secured to said framework adjacent the saw disc, a shaft rotatably mounted in said support, means fixed to said shaft and rotatably carrying at one end thereof a tooth-forming wheel and at the other end a burr-trimming wheel, whereby said tooth-forming wheel and said burr-trimming wheel are each shiftable into and out of engagement with the saw disc.

HUGH S. BROWN.